(12) United States Patent
Zhang et al.

(10) Patent No.: US 7,899,812 B2
(45) Date of Patent: Mar. 1, 2011

(54) SYSTEM AND METHOD FOR INTERACTIVE BROWSING

(75) Inventors: Li Zhang, Beijing (CN); Tao Liu, Beijing (CN); Jian Min Jiang, Beijing (CN); Zhong Su, Beijing (CN); Yue Pan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 12/133,844

(22) Filed: Jun. 5, 2008

(65) Prior Publication Data
US 2008/0313106 A1 Dec. 18, 2008

Related U.S. Application Data

(63) Continuation of application No. 11/715,090, filed on Mar. 7, 2007, now Pat. No. 7,552,114.

(51) Int. Cl.
G06F 17/30 (2006.01)
(52) U.S. Cl. .................. 707/722; 715/240; 715/246; 706/11
(58) Field of Classification Search ............ 707/1–10, 707/102, 3, 722, 899; 706/11; 715/700, 715/240, 246
See application file for complete search history.

(56) References Cited

U.S. PATENT DOCUMENTS

| | | | |
|---|---|---|---|
| 5,768,578 A * | 6/1998 | Kirk et al. ............... | 707/100 |
| 6,230,171 B1 | 5/2001 | Pacifici et al. | |
| 6,691,107 B1 | 2/2004 | Dockter et al. | |
| 6,701,376 B1 | 3/2004 | Haverstock et al. | |
| 6,763,349 B1 | 7/2004 | Sacco | |
| 6,895,397 B2 * | 5/2005 | Nagamura et al. ... | 707/E17.091 |

(Continued)

FOREIGN PATENT DOCUMENTS

CN 1568469 1/2005

(Continued)

OTHER PUBLICATIONS

A. Coles et al., "A Framework for Coordinated Multi-Modal Browsing with Multiple Clients," International World Wide Web Conference, May 2003, pp. 718-726, Budapest, Hungary.
O. De Bruijn et al., "RSVP Browser: Web Browsing on Small Screen Devices," Personal and Ubiquitous Computing, 2002, pp. 245-252, vol. 6, No. 4.

(Continued)

Primary Examiner—Mohammad Ali
Assistant Examiner—Thuy (Tiffany) Bui
(74) Attorney, Agent, or Firm—Van N. Nguy; Ryan, Mason & Lewis, LLP

(57) ABSTRACT

A method for achieving interactive browsing includes steps performed by a computer coupled to a knowledge base and a document database. The knowledge base stores a plurality of terms and information relating to each term, and the document database stores a plurality of documents. The steps include acquiring terms in which a user has interest; extracting information relating to the terms in which the user has interest from the knowledge base in order to display the information in a first display part of a user interface; and extracting documents containing the terms in which the user has interest from the document database in order to display a list of extracted documents in a second display part of the user interface.

22 Claims, 13 Drawing Sheets

U.S. PATENT DOCUMENTS

| | | | |
|---|---|---|---|
| 7,228,302 B2 * | 6/2007 | Kuchinsky et al. | 707/6 |
| 2002/0049705 A1 * | 4/2002 | Haviv-Segal et al. | 707/1 |
| 2006/0053104 A1 * | 3/2006 | Ferrari et al. | 707/3 |
| 2006/0184516 A1 * | 8/2006 | Ellis | 707/3 |
| 2006/0282411 A1 | 12/2006 | Fagin et al. | |

FOREIGN PATENT DOCUMENTS

| | | |
|---|---|---|
| WO | WO2006024965 | 3/2006 |
| WO | WO2006036127 | 4/2006 |

OTHER PUBLICATIONS

L. Burns et al., "Browsing: A Novel Facility for Exploring the Contents of a Datastore," IBM Technical Disclosure Bulletin, Dec. 1990, pp. 177-180, vol. 33, No. 7.

C. Olston et al., "ScentTrails: Integrating Browsing and Searching on the Web," ACM Transactions on Computer-Human Interaction, Sep. 2003, pp. 177-197, vol. 10, No. 3.

D. Warner et al., "Mining User Session Data to Facilitate User Interaction with a Customer Service Knowledge Base in RightNow Web," International Conference on Knowledge Discovery & Data Mining, Aug. 2001, pp. 467-472.

* cited by examiner

SYSTEM AND METHOD FOR INTERACTIVE BROWSING

CROSS-REFERENCE TO RELATED APPLICATION(S)

This application is a continuation of pending U.S. application Ser. No. 11/715,090 filed on Mar. 7, 2007, the disclosure of which is incorporated herein by reference.

FIELD OF THE INVENTION

The present invention generally relates to information technology, and more particularly, to a system and method for interactively browsing information.

DESCRIPTION OF RELATED ART

As more and more electronic documents are stored in computer, it becomes important how to manage the documents and get information effectively.

At present, there are primarily three ways to acquire information. The first one is taxonomy. Taxonomy typically organizes a large scale of documents into a hierarchical structure according to the content of the documents. The user can click the directory and find useful information. However, the user usually not only wants to browse documents, but also wants to get information of the terms in the documents, for example, the information about a person, a company, or a product mentioned in the documents in which he has much interest. In this circumstance, the traditional taxonomy based information browsing system cannot provide this kind of information directly.

The second way for user to acquire information is knowledge base. The knowledge base is a static information collection, through which the user can obtain explanation and illustration of specific terms. Since the content in the knowledge base is relatively stable and not updated in real time, it is difficult to associate with timely updated contents in the large scale of documents.

The third way for user to acquire information is keyword search, through which the user can obtain all the documents containing a certain keyword. Since the search is generally made without context, this approach is somewhat ambiguous. As a result, the results of the search include many unassociated documents, which prevents the user from acquiring desired information.

As can be seen, each of the above three ways can only respectively meet a certain aspect of user requirement to acquire information (either only browse the whole document, or only view a specific term), but can not meet various requirements concurrently. Therefore, it is desirable for the user to easily view specific terms in relevant documents in a single user interface while browsing the documents.

SUMMARY OF THE INVENTION

In view of the above problems, the invention provides a method and system for interactively browsing document set and the terms therein, which enables the user to acquire relevant information from the document set and knowledge base concurrently in one user interface.

According to one aspect of the invention, a system for achieving interactive browsing is provided, said system is coupled to a knowledge base and a document database, said knowledge base stores a plurality of terms and information relating to each term, and said document database stores a plurality of documents, said system comprising:

term acquiring means, for acquiring terms in which a user has much interest;

first extracting means, for extracting information relating to the terms in which the user has much interest, from the knowledge base;

second extracting means, for extracting documents containing the terms in which the user has much interest, from the document database;

a first display part in a user interface, for displaying information extracted by the first extracting means; and a second display part in the user interface, for displaying a list of the documents extracted by the second extracting means.

According to another aspect of the invention, a method for achieving interactive browsing is also provided, said method comprising:

acquiring terms in which a user has much interest;

extracting information relating to the terms in which the user has much interest, from a knowledge base, in order to display the information in a first display part of a user interface, said knowledge base stores a plurality of terms and information relating to each term; and extracting documents containing the terms in which the user has much interest, from a document database, in order to display a list of the extracted documents in a second display part of the user interface, said document database storing a plurality of documents.

Through the above system and method according to the invention, the user may browse the documents and knowledge base concurrently in a single interface.

The information relating to the terms preferably is their properties and/or relations among them.

In addition, said terms and their relevant information are preferably displayed in the first display part of the user interface in the form of a term graph, such that the terms and their properties and relations can be visually presented to the user.

The system and method according to the invention enable the user to browse the documents and their relevant terms concurrently, thereby enhancing the freedom and flexibility for the user to access information.

DETAILED DESCRIPTION OF THE PREFERRED EMBODIMENTS

Before describing the embodiments of the invention in greater detail, we will first discuss the meaning of the technical words used in the invention.

term: a special word describing things in the nature or in a virtual world, including name of a person, name of a place, name of an organization, specialized words such as IBM, DELL, and etc.;

knowledge base (KB): a database describing terms, their properties and relations among them;

document database (Doc DB): a database containing keywords, content of documents, and other metadata of documents;

term graph: a graphical representation of all the terms in the knowledge base and their properties and relations;

term sub-graph: a graphical representation of properties and relations of a part of terms in the knowledge base (since in the present specification, only "term sub-graph" is concerned in most circumstances, for discussion convenience, the "term sub-graph" is shortly referred to as "term graph"); and ontology: defining types of terms and properties and relations of various types of terms; for example, the type of COMPANY has properties like NAME, WEB_SITE, ADDRESS, CEO, PRODUCTS, and relations like COMPETITOR, PARTNER; the ontology is stored in the knowledge base.

Preferred embodiments of the invention will be discussed below with reference to the attached drawings. It shall be noted that, although the present specification will be described mainly by taking example for the documents in the Internet, the invention is not limited to this. The invention may be equally applied where information browsing and searching is needed, for example, in a database.

Illustrative User Interface

Figure 1:
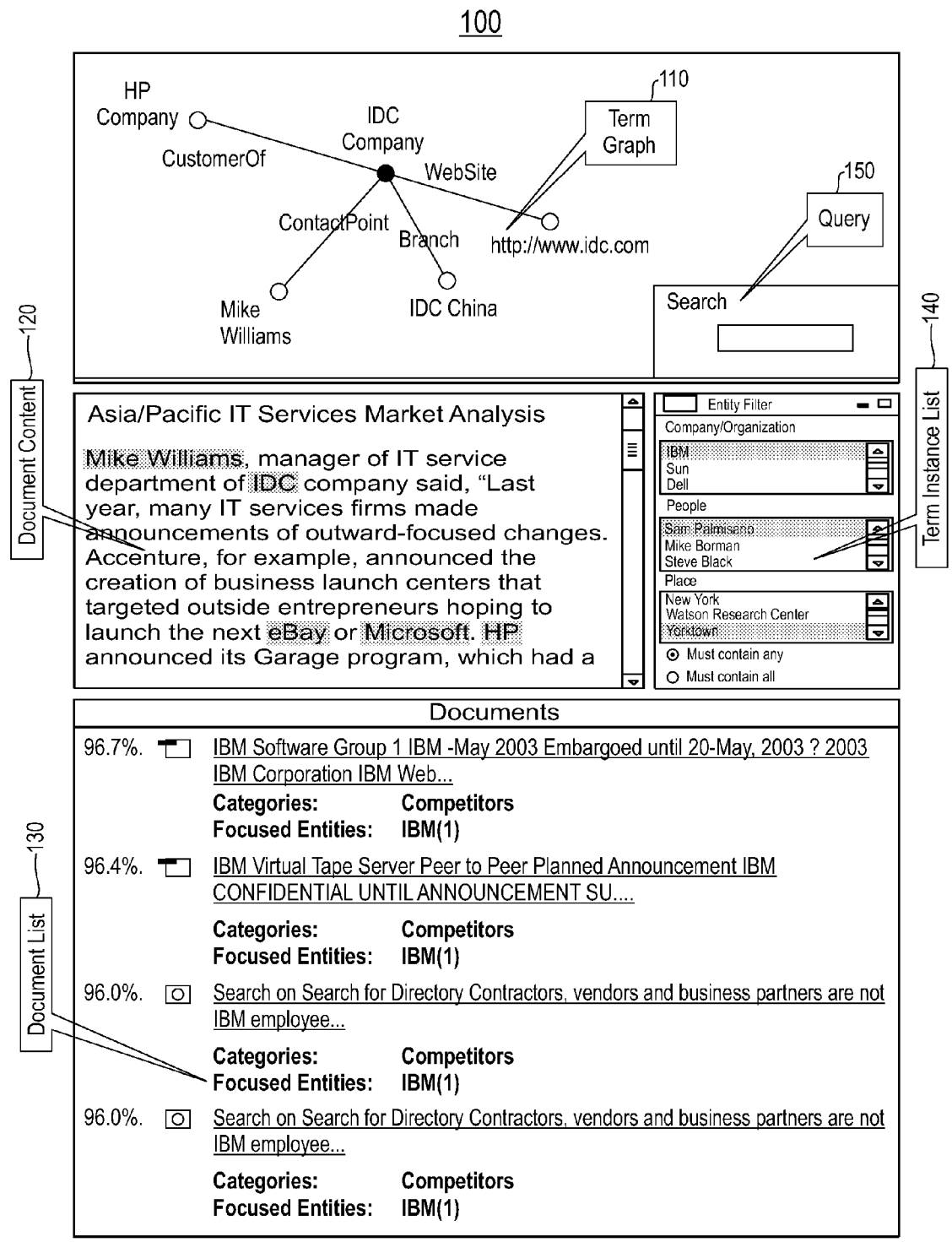
FIG. 1 is a schematic diagram showing a user interface when an embodiment according to the invention is employed.

Firstly refer to FIG. 1, which shows a schematic diagram of a user interface when a system and method of the invention are employed. FIG. 1 illustratively divides the user interface 100 into several windows including a term graph window 110, and a document list window 130, wherein a document content window 120, a term instance list window 140 and a query window 150 are preferable components of the invention.

When a user is interested in a specific term (for example, IDC company), preferably, he may submit the term "IDC company" to the system using the query window 150. The system may first retrieve information regarding "IDC company" from the knowledge base, and then display properties and relations of the term "IDC company" retrieved from the knowledge base in the term graph window 110, with the "IDC company" as a primary node.

For display convenience, FIG. 1 only shows a term graph extending from the primary node to a node in the next level (i.e. one edge). However, the present invention is not limited to this. The invention may display a term graph having nodes of arbitrary levels, depending on factors such as computing power of the system, size of a display interface and user's requirements.

In addition, according to a preferred embodiment of the invention, FIG. 1 shows displaying relations and properties of the terms by using a term graph of a tree structure, which can visually reflect various aspects of information of a term. A text description can also be used in place of the term graph. For example, the following text may be given in the term graph window 110:

"IDC company is a customer of HP company;

The website of IDC company is http://www.idc.com;

IDC China company is a branch of IDC company;

The contact of IDC company is Mike Williams;

. . .".

When the term "IDC company" is submitted to the system, it is also used to search the document database to acquire relevant documents. The searched relevant documents are listed in the document list window 130 subsequently. At this time, the user may click on a document to browse specific content of the document in the document content window 120.

Therefore, relevant information of the term and documents containing the term may be concurrently displayed in a single user interface for the user, thereby providing convenience for user to browse.

The user interface shown in FIG. 1 preferably includes a term instance list window 140 that displays a series of terms. The above terms may be input in advance (for example, a list of companies can be prepared and the companies' specific information can be displayed), or may be dynamically extracted from the current document list through text analysis. Further, the term instance list window 140 can also include some filtering criteria formed from AND/OR logical relation of the terms, for example, the occurrence of all the terms or the occurrence of any of the terms. Therefore, said term instance list window 140 composes a term filter from which the user can select a combination of different terms, use an appropriate filtering criteria to form a new query and submit the query to the system, such that a new document list can be extracted from the document database. In the embodiment as shown in FIG. 1, the newly extracted documents will be those documents that contain any one of three options highlighted in the term instance list window 140. Therefore, the flexibility for the user to browse documents and obtain information will be further improved.

As can be seen, the solution of the invention allows the user to retrieve information he has much interest in anywhere from the user interface, and to perform the retrieve cyclically until acquiring all the information he wants, which greatly improves the freedom and flexibility for the user to acquire information.

Structural Configuration and Operation Mode

Figure 2:
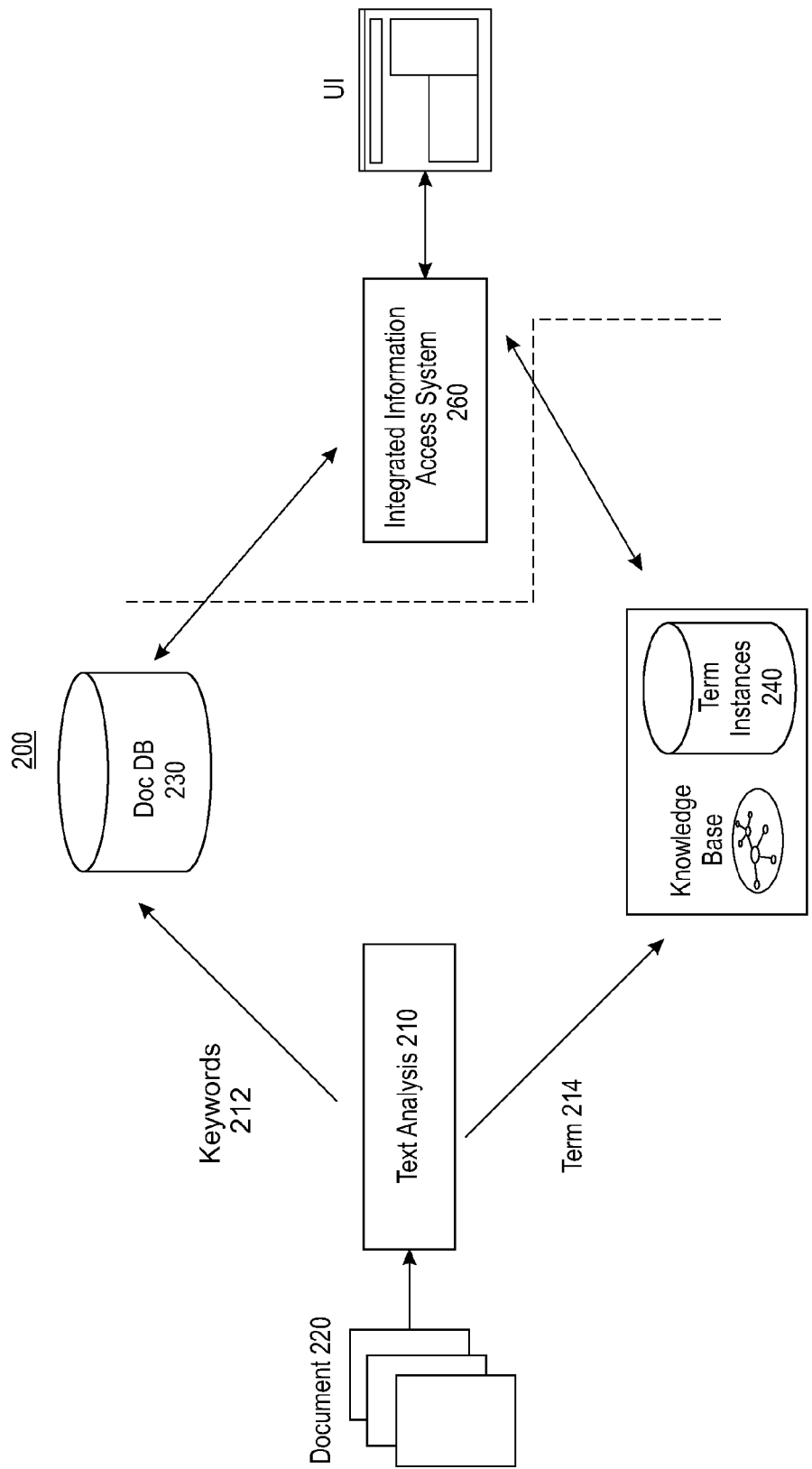
FIG. 2 is a schematic diagram showing a system in which the invention can be applied.

FIG. 2 is a schematic diagram showing an overall system 200 in which the invention can be employed. The left side of the dotted line in the system 200 shows conventional portions forming the document database and the knowledge base, and the right side shows a portion that employs an integrated information access system according to the invention.

The traditional portions forming the document database and the knowledge base comprise a text analysis portion 210, which performs text analysis on the documents in document set 220, which includes analyzing input text information to extract keywords 212 and terms 214 therefrom.

For example, the keywords 212 in the document may be extracted by a natural language tokenizer (not shown). A named entity recognizer can also extract named entities automatically (i.e. those special words serving as terms). The information such as keywords and named entities are submitted to the document database 230 and stored in it, for convenience of document query.

The terms 214, their relations and properties recognized by said text analysis operation are submitted to the knowledge base 240 to compose term instances and information such as properties and relations of the terms. The information about the terms is stored in the knowledge base. Ontology can be used to describe the type of the terms in the knowledge base and their properties and relations. For example, the type of the terms can be PERSON, COMPANY, PLACE, etc. The properties for a COMPANY can be NAME, WEB_SITE, ADDRESS, CEO, PRODUCTS, etc. The information in the knowledge base can be input by human manually, or extracted by an information extractor from the documents automatically. Both the ontology information and the term instance information are stored in the knowledge base.

For a traditional system, the document database 230 and the knowledge base 240 operate independently from each other, one providing document content for the user and the other providing term information for the user. They produce their own user interfaces, respectively.

However, according to the invention, it is possible to associate the document database 230 with the knowledge base 240 by adding an integrated information access system 260, thus making it possible to generate a user interface as shown in FIG. 1.

Figure 3:
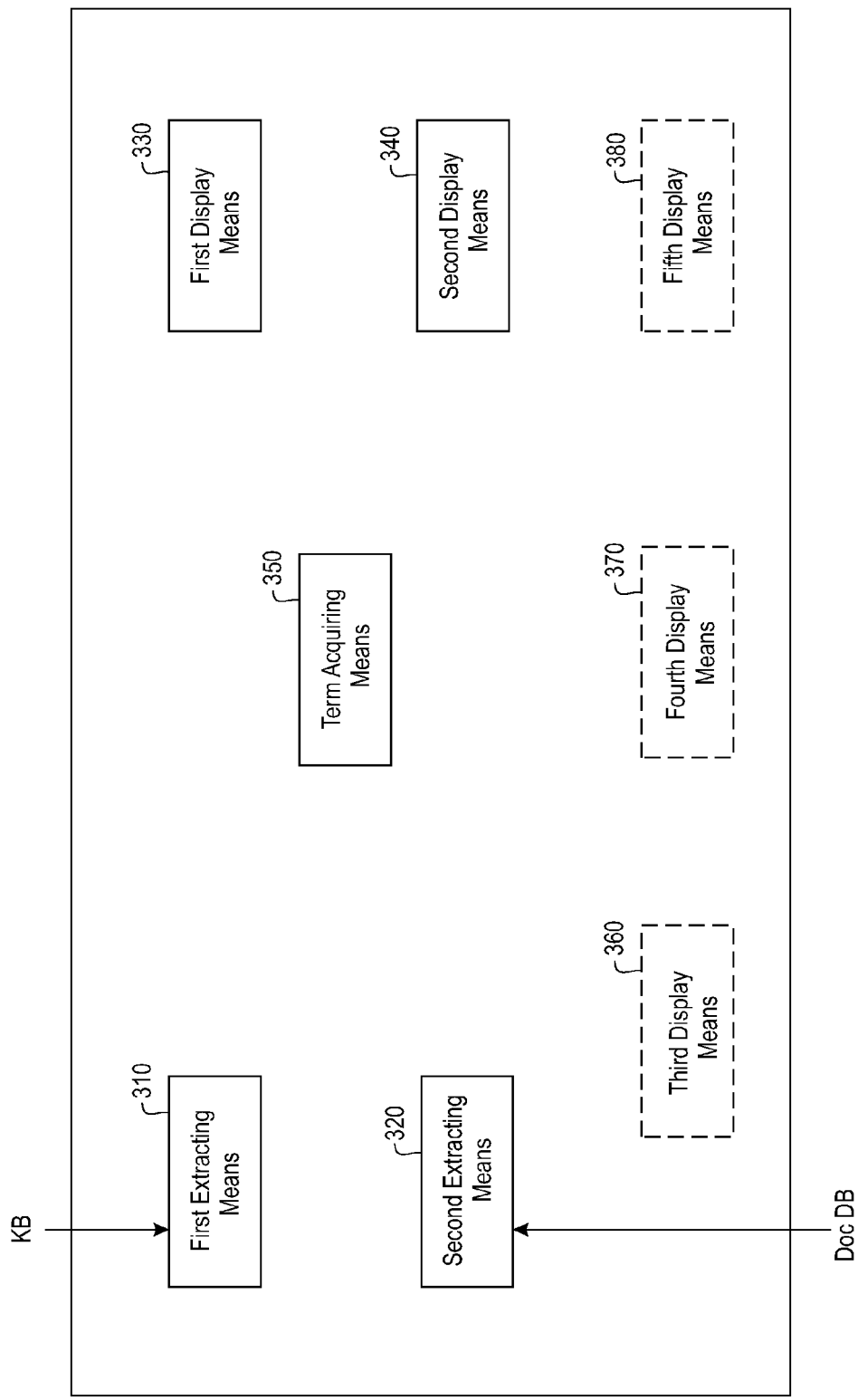
FIG. 3 is a schematic diagram showing a structure of an integrated information access system according to the invention.

The structure of the integrated information access system 260 will be described in greater detail below with reference to FIG. 3. FIG. 3 is a schematic diagram showing the overall structure of the integrated information access system 260 according to the invention, in which components represented by solid-line-blocks are basic components of the invention, and components represented by dotted-line-blocks are optional components of the invention.

As shown in FIG. 3, the integrated information access system 260 comprises first extracting means 310 connected to the knowledge base, from which information regarding the terms the user has much interest in can be extracted (the information may comprise properties or relations of the terms); second extracting means 320 connected to the document database, from which documents containing the terms in which the user has much interest can be extracted; a first display part 330 for displaying the information extracted by the first extracting means 310; a second display part 340 for displaying a list of the documents extracted by the second extracting means 320; and a term acquiring means 350 for acquiring terms in which the user has much interest.

In a preferred embodiment of the invention, said term acquiring means 350 can acquire terms either from the information displayed in the first display part 330 or from the list of documents displayed in the second display part 340.

According to another preferred embodiment of the invention, said integrated information access system 260 also comprises a third display part 360 in the user interface, for displaying specific content of a certain document in the list of the second display part 340. Said term acquiring means 350 can also acquire the terms in which the user has much interest from the third display part. For example, when the user clicks on a certain document in the documents extracted from the document database, its content will be displayed through the third display part 360, and said term acquiring means 350 can acquire the specific terms in which the user has much interest from the third display part 360, in order to complete the operations as described before in the invention. Further, when the user is interested in a specific term occurred in the certain document, he might further view the information on the term graph of the term.

According to another preferred embodiment of the invention, said integrated information access system 260 further comprises a fourth display part 370 serving as the term instance list window 140. Said fourth display part can include some filtering criteria formed by AND/OR logical relations of the terms, for example, the occurrence of all the terms or the occurrence of any term. Each filtering criteria comprises a plurality of options. Said term instance list may be input to the system in advance (for example, a list of companies can be prepared and the companies' specific information can be displayed), or can be obtained by performing the text analysis as described before on the document list. Therefore, the user may select a combination of different options from the window, form a new query and submit it to the system, such that a new document list can be extracted from the document database.

According to another embodiment of the invention, said integrated information access system 260 also comprises a fifth display part 380 used as the query window 150. Said term acquiring means 350 can also acquire specific terms in which the user has much interest from the fifth display part (for example, through an input operation of the user), in order to carry out the operations as described before in the invention.

The term acquiring means 350 preferably further comprises a query forming means (not shown) for extracting corresponding terms in the new term graph and their properties and relations, from the knowledge base, forming a new query and submitting the query to the document database.

The term acquiring means 350 preferably further comprises a text analysis means (not shown) for performing text analysis on the document list in order to extract the terms in which the user has much interest and their properties or relations. Said text analysis means can perform said text analysis operation online (for example by sorting the terms and determining their weights), or, if the document database itself has performed text-recognition on the terms, said text analysis means can also acquiring the terms from the document database directly. Further, when said text analysis means deciding which terms are to be extracted, it can extract the terms according to user's demand based on categories of the terms (for example, company, place, task, and so on) or priority (for example, frequency of occurrence of a term or weight of the term).

As will be appreciated by those skilled in the art, various means used in the invention may be implemented by programming, discrete hardware components or the combination of the two.

Figure 4:
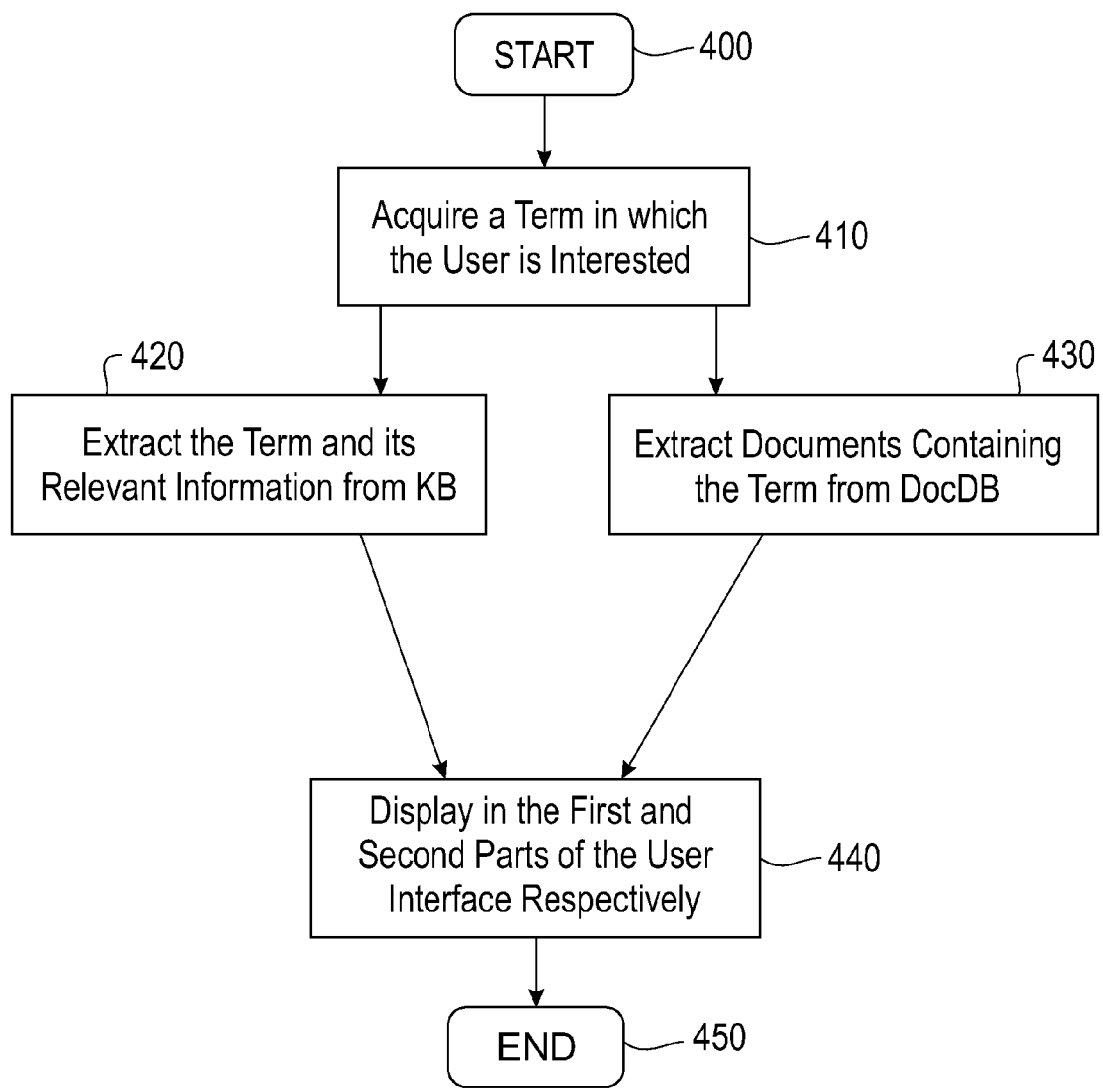
FIG. 4 is a flowchart diagram showing a method according to the invention.

A flowchart of a method according to the invention is shown in FIG. 4. The method starts at step 400, and then proceeds to step 410. In step 410, the system acquires a term in which the user has much interest (for example, "IDC company"). Next, in step 420, the system extracts information relating to the term in which the user has much interest from the knowledge base. At the same time, in step 430, the system extracts documents containing the terms in which the user has much interest from the document database. Then in step 440, the information extracted in steps 420 and 430 is respectively displayed in the first and second display part of the user interface. Thereafter, the operations in steps 410-440 may be repeated as needed, such that the system can continuously acquire the terms in which the user has much interest from the first and second display parts, in order to enable the user to freely browse the desired documents and term information. The method according to the invention ends at step 450.

Different ways for acquiring terms from different parts of the user interface by the term acquiring means according to the invention will be described below with reference to FIGS. 5-7.

Figure 5:
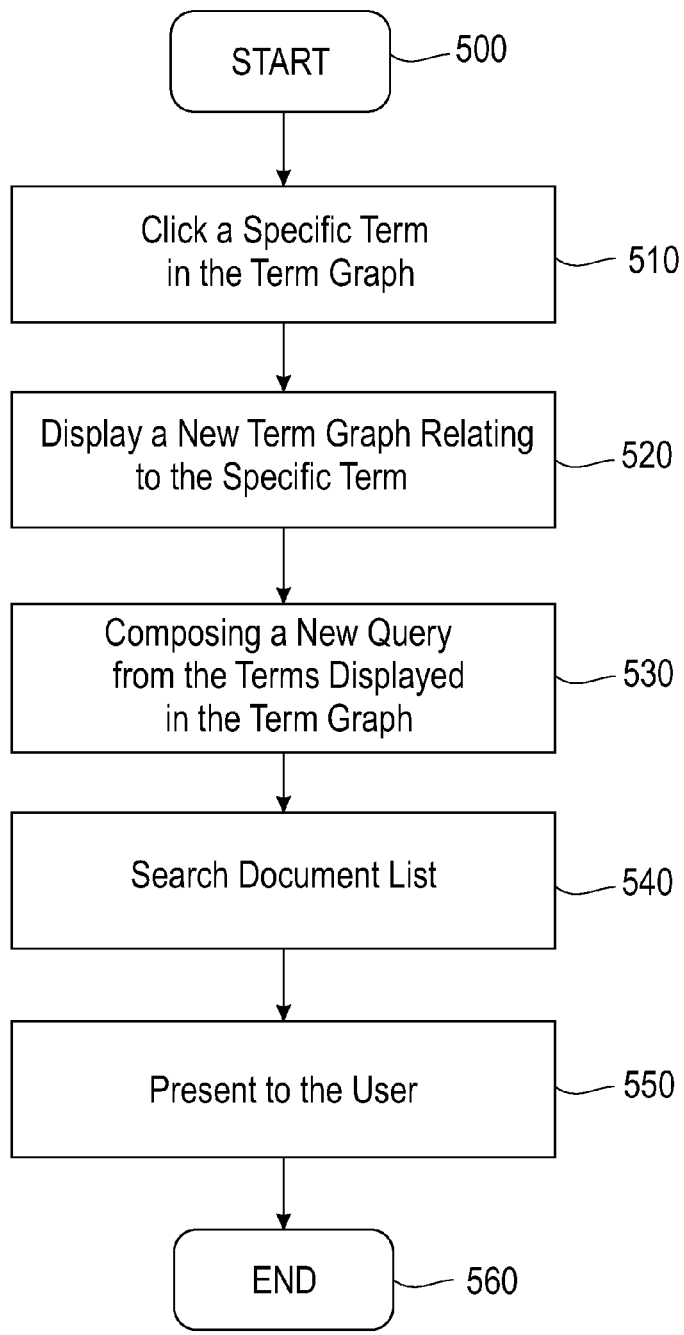
FIG. 5 shows a flowchart diagram when a term acquiring means acquires terms from a first display part, and presents relevant term graphs and documents.
Figure 6:
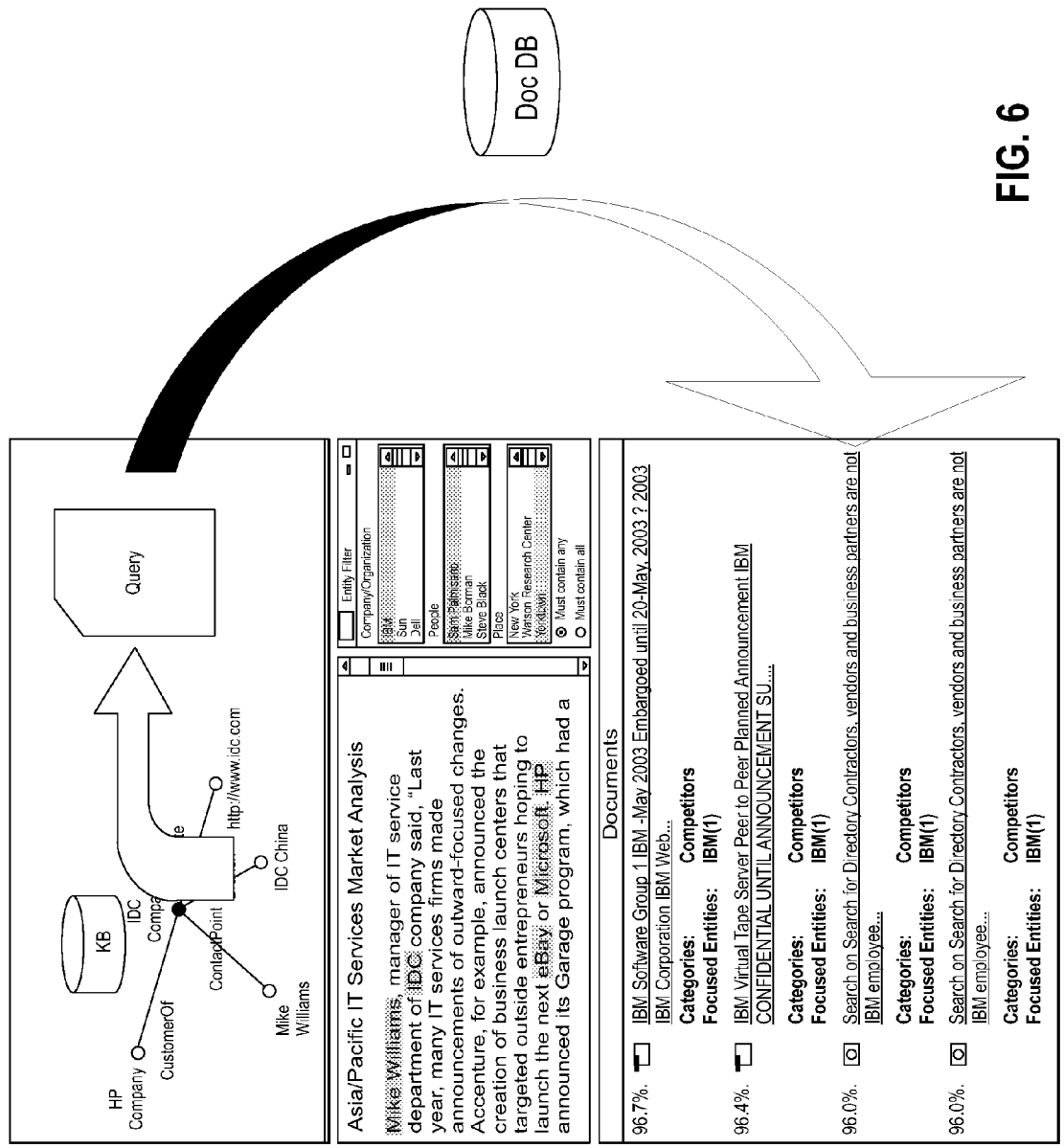
FIG. 6 is a schematic diagram showing a user interface for generating a document list from the term graph.

FIG. 5 depicts a situation where said term acquiring means 350 further acquires a term from the first display part 330 and presents its relevant term graph and document. That is, the user desires to acquire a new term graph relating to another term (for example, HP company) in the term graph of the current term (here, "IDC company") and views a list of documents relating to the new term graph.

The method of FIG. 5 starts at step 500, and then proceeds to step 510. In step 510, still taking example for the term graph as shown in FIG. 1, it is assumed that the system has acquired another term (for example, "HP company") from the user in which he has much interest. Then, in step 520, the first extracting means 310 extracts a new term graph relating to the term from the knowledge base to display it in the first display part of the system. Then, the method according to the invention proceeds to step 530 where corresponding terms in the new term graph and their properties and relations are extracted from the knowledge base to form a new query and the query is submitted to the document database. Next, in step 540, the document database is searched in response to the query to find documents matching with the query. Then, in step 550, the found matched documents are presented to the user. The method according to the invention ends at step 560, and a corresponding user interface is shown in FIG. 6.

In the operation of step 530 in FIG. 5, on one hand, one can only extract properties and relations relating to a primary node (here, "HP company") of the new term graph from the knowledge base, and form a new query by using the primary node and its property and relation to search for further documents; on the other hand, one can extract properties and relations relating to a plurality of nodes in the new term graph from the knowledge base, and form a new query by using the plurality of nodes and their properties and relations to search for further documents. In an actual operation, which one of the above two ways is adopted may be specified by the user or preset by the system.

Figure 7:
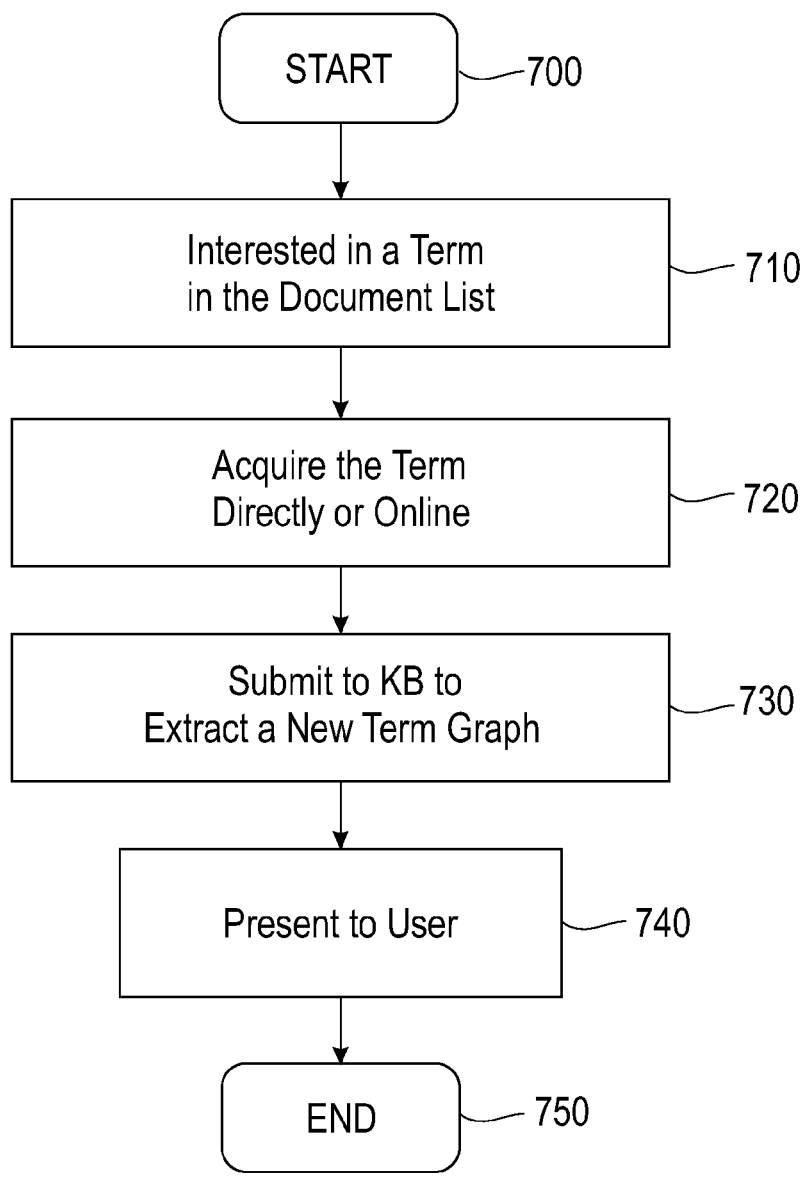
FIG. 7 shows a flowchart diagram when a term acquiring means acquires terms from a second display part, and presents corresponding term graphs.

FIG. 7 describes a situation where said term acquiring means 350 acquires a term from the document list window in the second display part 340 and presents corresponding documents. That is, the user desires to view the specific terms occurred in the document list or relations among them.

The method of FIG. 7 starts at step 700, and then proceeds to step 710. In step 710, it is assumed that, the user is interested in certain terms existed in the document list and their properties or relations. Then, in step 720, the term acquiring means 350 extracts the term in which the user has much interest and its property or relation by performing text analysis on the document list through its text analysis means.

Figure 8:
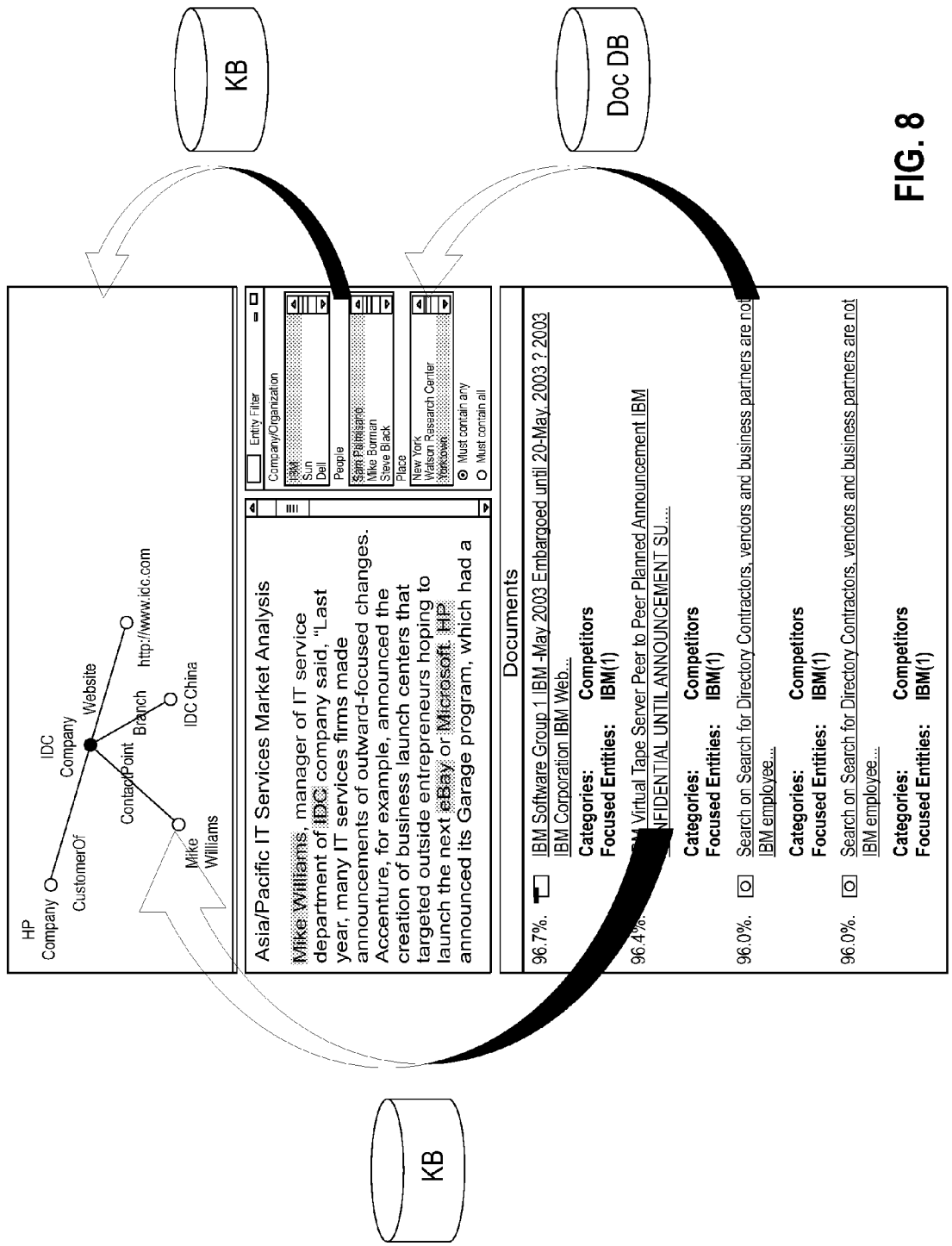
FIG. 8 is a schematic diagram showing a user interface for generating a term graph from the document list.

After that, the method according to the invention proceeds to step 730 where the term acquired in step 720 is submitted to the first extracting means for extracting a term graph relating to the term from the knowledge base. Then in step 740 the term graph is displayed. The method of the invention ends at step 750 and a corresponding user interface is shown in FIG. 8.

Figure 9:
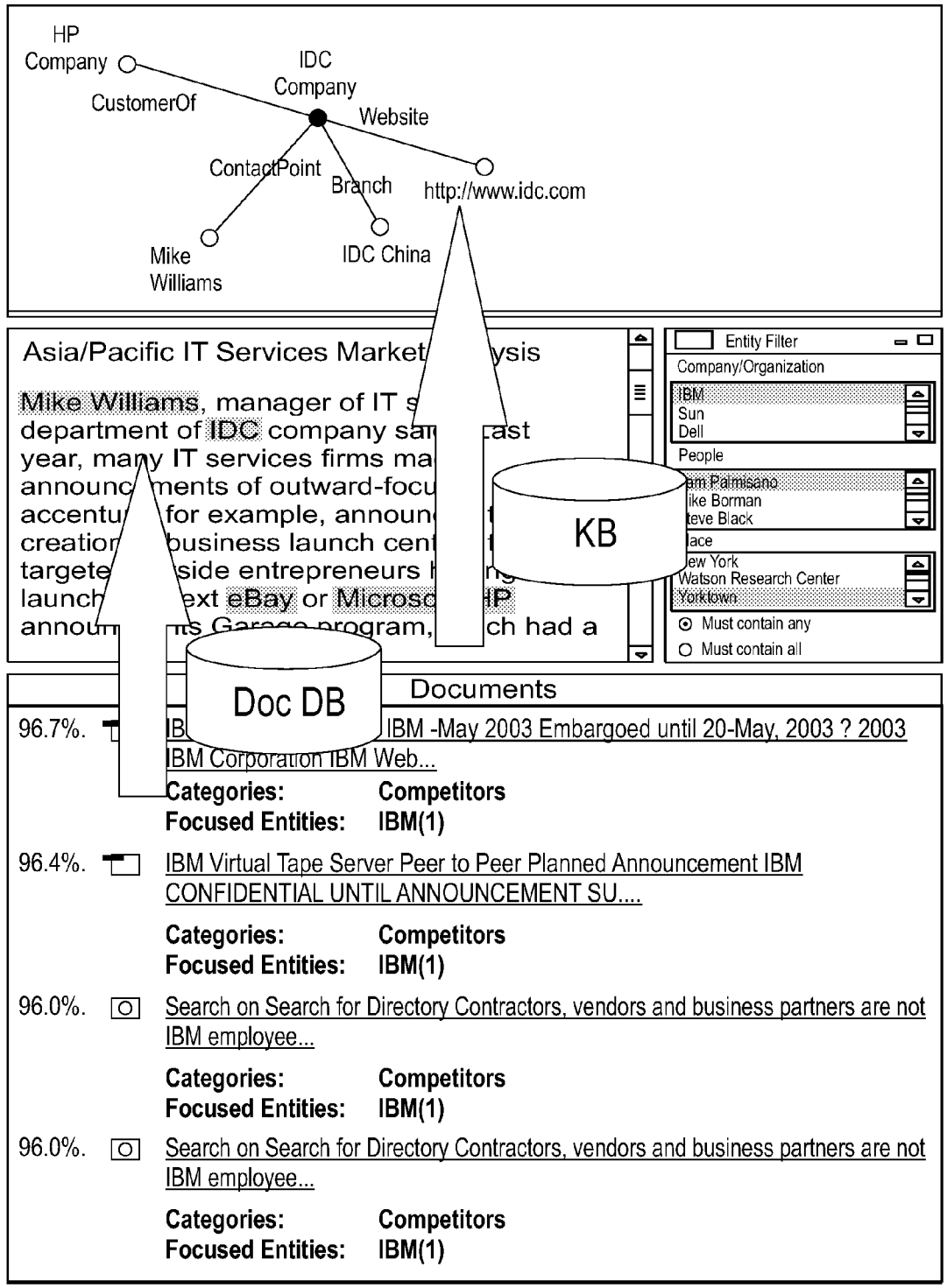
FIG. 9 is a schematic diagram showing a user interface for generating a term graph from one document.

As shown in the user interface of FIG. 1, words serving as the terms will be highlighted in the content of the document, which is a result of extracting or recognizing terms when the system performs the text analysis initially. Those words that are not extracted as terms when the text analysis is initially performed will not be highlighted. However, regardless of a word being highlighted or not, if the user is interested in its further information, it may be submitted to the system by for example, clicking the word or through a similar input mechanism (which is known in the related art and will not be discussed in detail). Therefore, relevant term information and/or documents may be acquired according to the flowchart of the method of FIG. 4. A corresponding user interface is shown in FIG. 9.

In addition, if the user desires to view all the terms occurred in the content of the document and the term graph of their relations and properties, he can refer to the flowchart of the method of FIG. 7. In this circumstance, text analysis is also needed, for example by determining weights of the terms and sorting, etc. Then a new query is formed by the terms to be submitted to the knowledge base in order to extract a term graph relating to the terms and display it in the first display part.

Illustrative Functions and Algorithms

Figure 10:
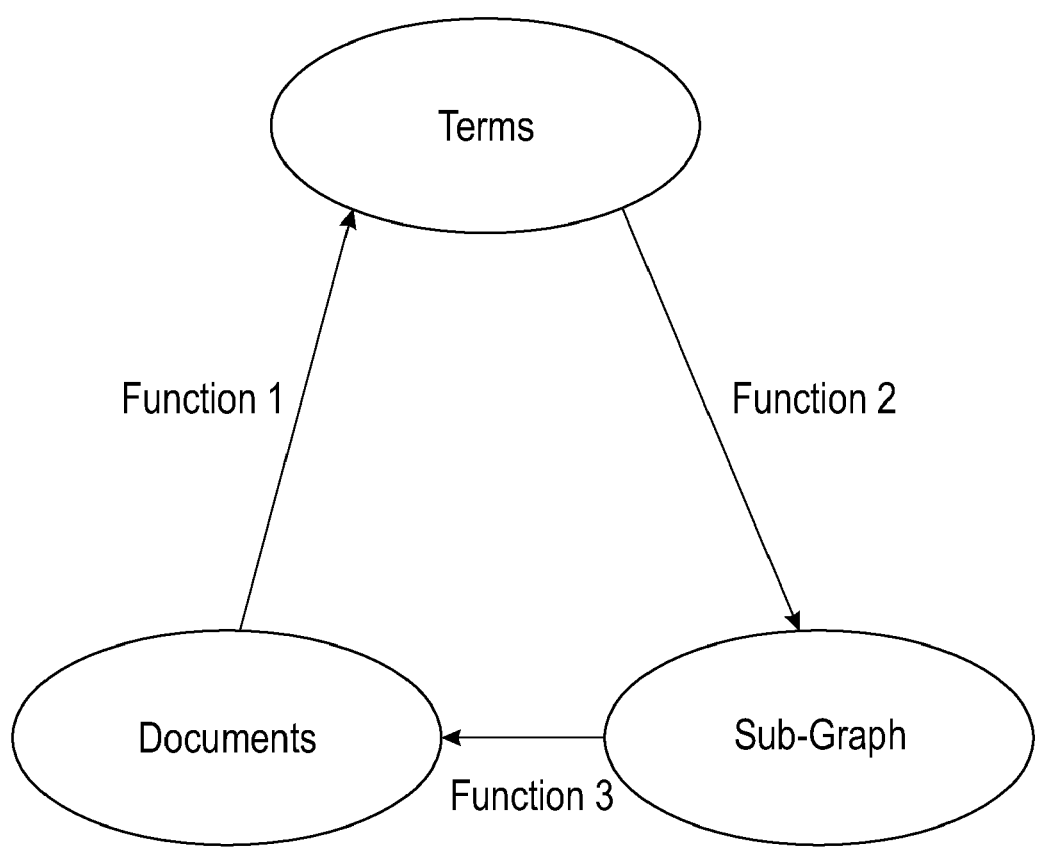
FIG. 10 shows functional relations between stages of the method and system according to the invention.

In the system and method according to the invention as descried before, the interaction between the documents, terms and sub-graphs may be represented by using functional relations as shown in FIG. 10. Illustrative algorithms of Functions 1-3 are given below, which are represented by flowcharts of FIGS. 11-13 respectively. The functions given here aim at illustrating the principle of the invention, and shall not be construed as any limitation to the invention. It is assumed that, in these functions, the term graph formed by all the terms in the knowledge base K is G that contains a term set T and the document set is D.

Figure 11:
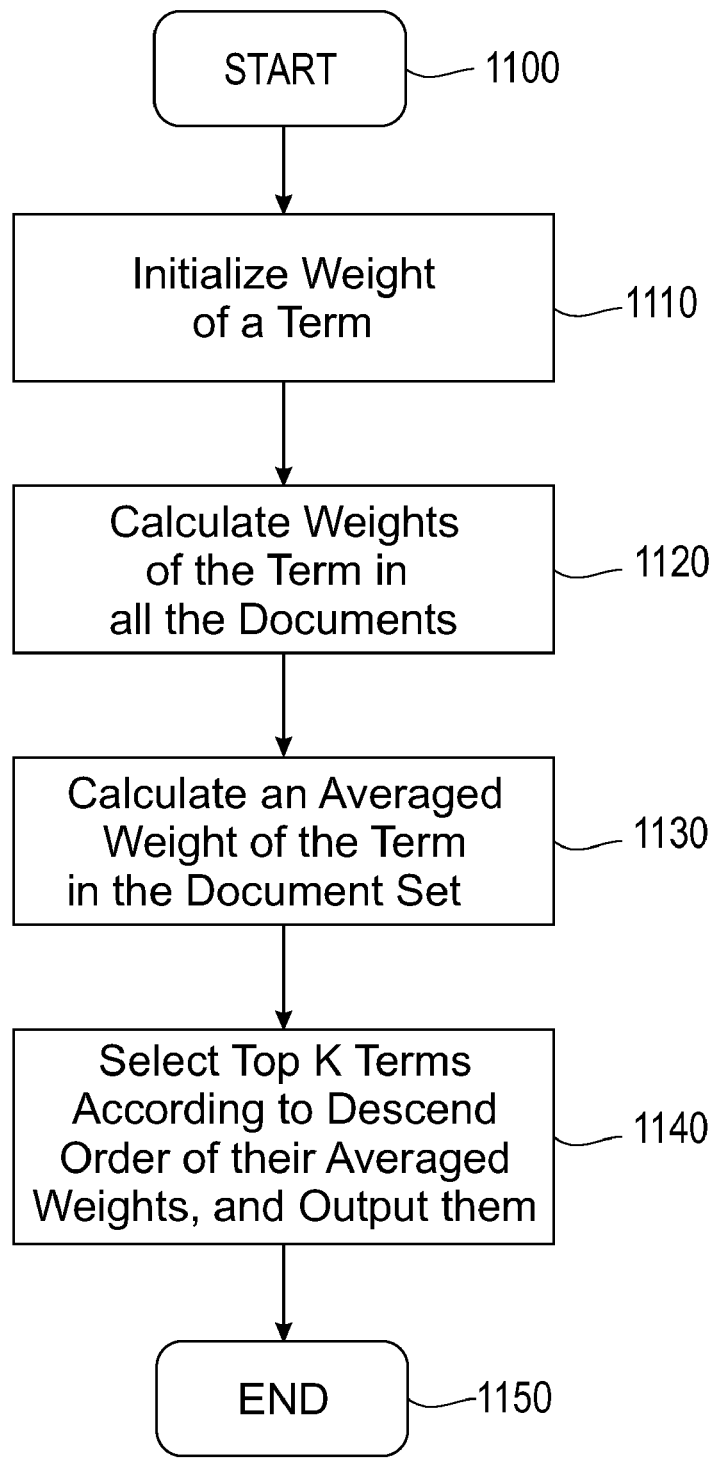
FIGS. 11-13 are flowchart diagrams showing Function 1, Function 2, and Function 3 interacted between documents, terms and sub-graphs, respectively.

FIG. 11 shows a method for generating terms from the document list (Function 1).

Here, suppose m documents $\{d_1, \ldots, d_m\}$, in which there are T terms. The method of FIG. 11 starts at step 1100 and proceeds to step 1110. In step 1110, the weight of each term is initialized to 0, i.e. $w_t=0.0$ (where $t=1, \ldots, T$).

Then in step 1120, the weight of each term is calculated for each document $d_j$ (where $j=1, \ldots, m$) as follows:

$$w_{j,t} = tf_{j,t} * idf(t)$$

Where $w_{j,t}$ is a weight of the t-th term ($t=1, \ldots T$) in the j-th document $d_j$ of the document set, $tf_{j,t}$ represents the frequency of the t-th term occurred in the j-th document $d_j$;

$$idf(t) = \log \frac{N}{N_t}$$

where N represents the number of the t documents in the document set, $N_t$ represents the number of the documents containing the term t in the document set, idf(t) is called an inverse document frequency which decreases with the increase of $N_t$. By iterating the above equation, the weighs of all the terms in the document $d_j$ can be calculated.

Then, in step 1130, the weights of each term in the m documents are arithmetically averaged, such that the average weight of the term is calculated as follows:

$$w_t = \sum_{j=1}^{m} w_{j,t}/m$$

Then, in step 1140, the terms are sorted in descend order according to their average weights. Top k terms are selected to compose a query. The method as shown in FIG. 11 then ends at step 1150.

Figure 12:
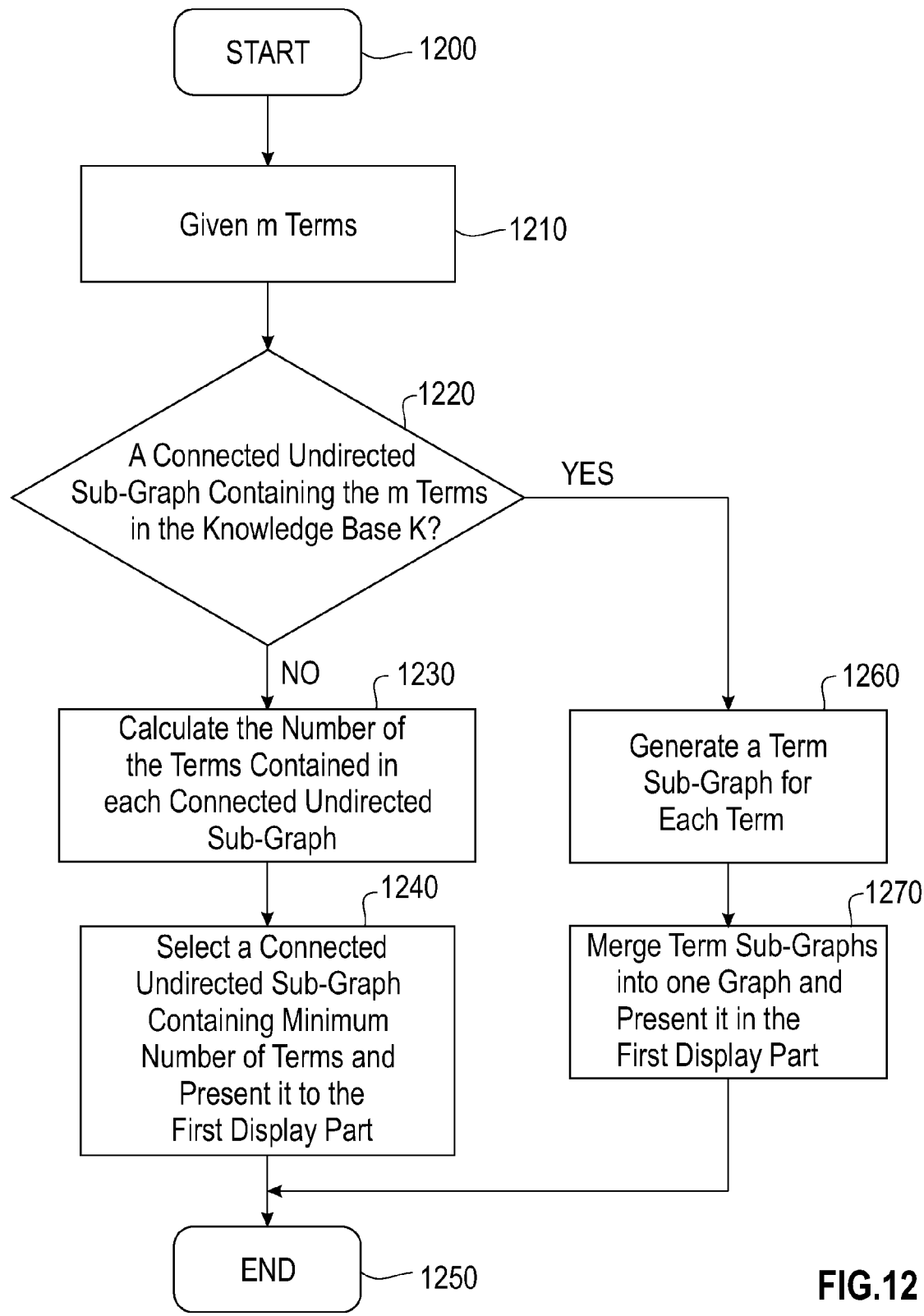

FIG. 12 shows a method for generating a sub-graph from the terms (Function 2).

The method of FIG. 12 starts at step 1200 and proceeds to step 1210. In step 1210, suppose m terms $\{t_1, \ldots, t_m\}$.

In step 1220, it is determined whether a connected undirected sub-graph $\{G_1, \ldots, G_n\}$ containing the m terms exists in the term graph G in the knowledge base K. If YES, the method proceeds to step 1230 where the number $(I_1, \ldots, I_n)$ of the nodes in each connected undirected sub-graph is calculated. In step 1240, the connected undirected sub-graph $G_k$ containing minimum number of nodes is selected to be presented to the first display part. The method of FIG. 12 ends at step 1250.

If the result of step 1220 is NO, that is, there does not exist a connected undirected sub-graph $\{G_1, \ldots, G_n\}$ containing the m terms in the term graph G in the knowledge base K, then the method proceeds to step 1260. For each term $t_i \in \{t_1, \ldots, t_m\}$, a term graph $G_i$ is respectively generated, wherein $G_i$ contains a term $t_i$ and all the nodes and edges connected to the $t_i$ (i.e. terms and relations). Then, in step 1270, the m sub-graphs $\{G_1, \ldots, G_m\}$ are merged into a graph to be presented in the first display part. The method then proceeds to step 1250 to end the method.

Figure 13:
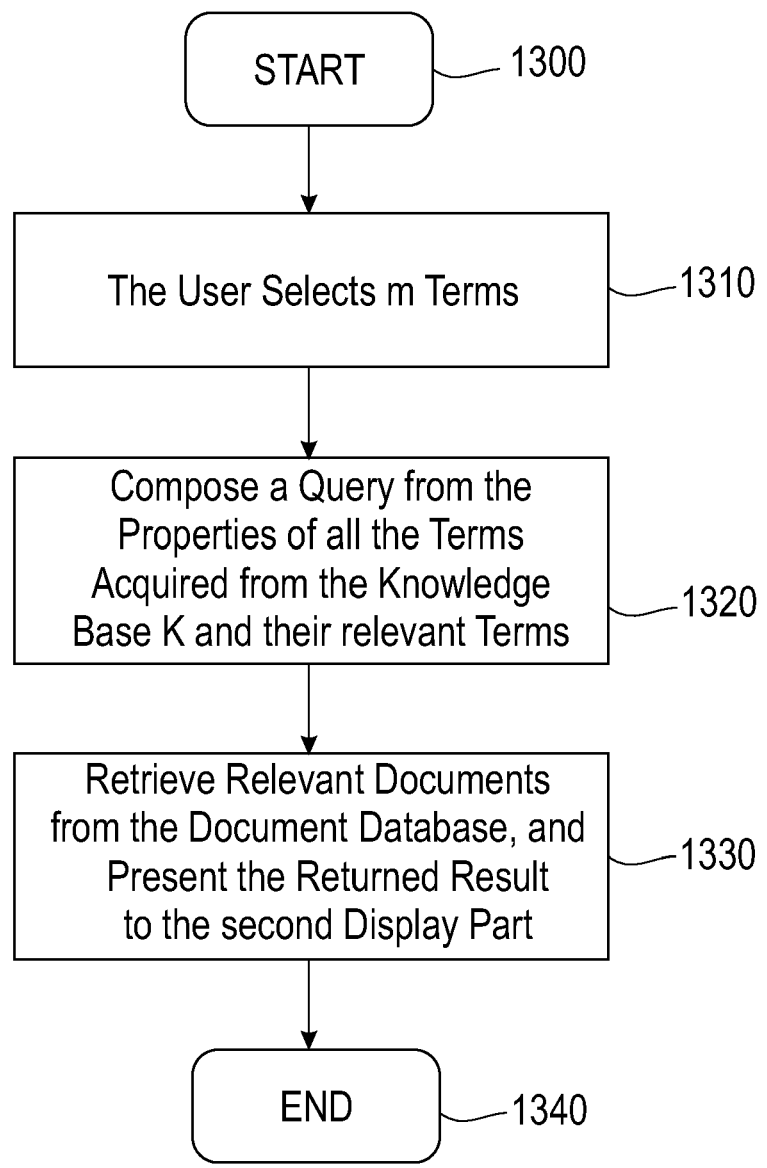

FIG. 13 shows a method for generating the document list from sub-graphs (Function 3). The method of FIG. 13 starts at step 1300 and proceeds to step 1310. In step 1310, given a sub-graph $G_j$, suppose that the user has selected m (m≧1) terms. Then in step 1320, for each term $t_i$, its property and its relevant terms (i.e. the terms connected to the term node and their relations) are acquired from the knowledge base K, from which a query is composed to be submitted to the document database for query. Then in step 1330, relevant documents are retrieved in the document database, and the returned document list is presented to the second display part. The method as shown in FIG. 13 ends at step 1340.

A process for acquiring a new term from the term graph in the first display part to query the term graph of the new term and its relevant documents, as described with reference to FIG. 5 above, can be achieved illustratively by the combination of Function 2 and Function 3.

A process for extracting a term from the document list to view the term graph of the term, as described with reference to FIG. 6 above, can be achieved illustratively by the combination of Function 1 and Function 2.

A process for viewing a term in the content of the document as described above can be achieved illustratively by Function 2.

It can be seen from the above that, the system and method according to the invention provides great flexibility for user to browse information. The user can acquire desired information anywhere from the user interface.

It will be appreciated by those skilled in the art that, embodiments of the present invention may be provided as methods, systems, or computer program products. Accordingly, the present invention may take the form of an entirely hardware embodiment, an entirely software embodiment, or an embodiment combining software and hardware aspects. A typical combination of hardware and software can be a universal computer system with a computer program. When the program is loaded and executed, the computer system is controlled to perform the above methods.

Furthermore, the present invention may be embodied in a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions (which execute via the processor of the computer or other programmable data processing apparatus) create means for implementing the functions specified in the flowchart and/or block diagram block or blocks.

These computer program instructions may also be stored in one or more computer-readable memories, where each such memory can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded into one or more computers or other programmable data processing apparatus to cause a series of operational steps to be performed on the computers or other programmable apparatus to produce, on each such device, a computer implemented process such that the instructions which execute on the device provide steps for implementing the functions specified in the flowchart and/or block diagram block or blocks.

The above preferred embodiments in connection with the present invention explain the principles of the present invention. The above explanation is merely exemplary and cannot be understood as any limitation to the present invention. Based on the above explanation, those skilled in the art can make any modification or variation to the present invention. However, these modifications and variations are within the scope and spirits as defined in the enclosed claims.

The invention claimed is:

1. A system for interactive browsing, wherein the system is coupled to a knowledge base and a document database, the knowledge base stores a plurality of terms and information relating to each term, and the document database stores a plurality of documents, the system comprises:
   term acquiring means, for acquiring one or more terms in which a user has interest;
   first extracting means, for extracting information relating to the one or more terms in which the user has interest from the knowledge base;
   second extracting means, for extracting documents containing the one or more terms in which the user has interest from the document database;
   a first display part in a user interface, for displaying information extracted by the first extracting means; and
   a second display part in the user interface, for displaying a list of the documents extracted by the second extracting means;
   wherein the information extracted by the first extracting means and the list of the documents extracted by the second extracting means are concurrently displayed in the same user interface such that: (i) selection by the user of a portion of the information displayed in the first display part effectuates a change in the list of documents displayed in the second display part; and (ii) selection by the user of a term in the list of documents displayed in the second display part effectuates a change in the information displayed in the first display part.

2. The system according to claim 1, wherein the term acquiring means acquires the one or more terms in which the user has interest from the first or second display part.

3. The system according to claim 1, wherein the information relating to each term comprises at least one of the property and relation of the term.

4. The system according to claim 1, wherein the first display part displays the one or more terms in which the user has interest and at least one of their relations and properties by a term graph or a text description.

5. The system according to claim 1, further comprising a third display part in the user interface, for displaying content of a specific document in the documents listed in the second display part, and the term acquiring means also acquires the one or more terms in which the user has interest from the third display part.

6. The system according to claim 1, wherein the term acquiring means further comprises query composing means for, when the first display part displays a new term graph relating to the terms in which the user is further interested, extracting one or more terms in the new term graph and their relevant information from the knowledge base, in order to compose a new query and submit it to the document database.

7. The system according to claim 1, wherein the term acquiring means further comprises text analysis means, for extracting the terms contained in the document list or document content, submitting them to the first extracting means to extract the term graph relating to the terms and display the term graph in the first display part.

8. The system according to claim 7, wherein the text analysis means extracts the terms from the document list or the document content by at least one of the following ways: 1) performing online text analysis on the document list or the document content; and 2) extracting the terms from the document database directly.

9. The system according to claim 1, further comprising a fourth display part in the user interface for forming a term filter comprising one or more term instances and filtering criteria, the term filter uses the one or more term instances and filtering criteria to compose a new query, in order to search a new document list.

10. The system according to claim 9, wherein the filtering criteria comprise at least one of an AND relation of the term instances and an OR relation of the term instances; at least one term instance is input to the system in advance or is dynamically extracted from a previous document list.

11. The system according to claim 1, further comprising a fifth display part in the user interface for the user to directly input one or more specific terms in which the user has interest and to transmit them to the term acquiring means.

12. A method for interactive browsing, comprising the steps of:
acquiring one or more terms in which a user has interest;
extracting information relating to the one or more terms in which the user has interest from a knowledge base, in order to display the information in a first display part of a user interface, the knowledge base stores a plurality of terms and information relating to each term; and
extracting documents containing the one or more terms in which the user has interest from a document database, in order to display a list of the extracted documents in a second display part of the user interface, the document database storing a plurality of documents;
wherein the information extracted in the first extracting step and the list of the documents extracted in the second extracting step are concurrently displayed in the same user interface such that: (i) selection by the user of a portion of the information displayed in the first display part effectuates a change in the list of documents displayed in the second display part; and (ii) selection by the user of a term in the list of documents displayed in the second display part effectuates a change in the information displayed in the first display part;
wherein one or more of the steps are performed by a computer coupled to the knowledge base and the document database.

13. The method according to claim 12, wherein the information relating to each term comprises at least one of the property and relation of the term.

14. The method according to claim 12, further comprising, when the user views content of a specific document in the document list, displaying content of the document in a third display part of the user interface.

15. The method according to claim 12, further comprising:
displaying one or more term instances and filtering criteria in a fourth display part of the user interface; and
using the one or more term instances and the filter criteria to compose a new query, in order to search a new document list.

16. The method according to claim 15, wherein the filtering criteria comprise an AND relation of the term instances and an OR relation of the term instances, and at least one term instance is input in advance or is dynamically extracted from a previous document list.

17. The method according to claim 12, wherein the step for acquiring the one or more terms acquires the terms in which the user has interest from the first display part.

18. The method according to claim 17, wherein the step for acquiring the terms in which the user has interest from the first display part further comprising the steps of:
displaying a term graph of the acquired terms in the first display part;
composing a new query by extracting at least one of the terms and their relevant information from the knowledge base, and submitting the query to the document database;
extracting a list of relevant documents; and
displaying the list of the extracted documents in the second display part.

19. The method according to claim 15, wherein the step for acquiring terms further acquires the terms in which the user has interest from one of the second display part, the third display part and the fourth display part.

20. The method according to claim 19, wherein the step for acquiring the terms, when acquiring the terms in which the user has interest from the second, third or fourth display part, further comprising the steps of:
extracting the terms contained in the document list or document content to compose a new query;
extracting a term graph relating to the terms; and
displaying the extracted term graph in the first display part.

21. The method according to claim 12, wherein the step for acquiring terms further acquires the terms in which the user has interest from a fifth display part which is used for the user to directly input specific terms in which the user has interest.

22. The method according to claim 21, wherein the step for acquiring the terms, when acquiring the terms in which the user has interest from the fifth display part, further comprising the steps of:
extracting the terms contained in the fifth display part to compose a new query;
extracting a term graph relating to the terms; and
displaying the extracted term graph in the first display part.

* * * * *